UNITED STATES PATENT OFFICE.

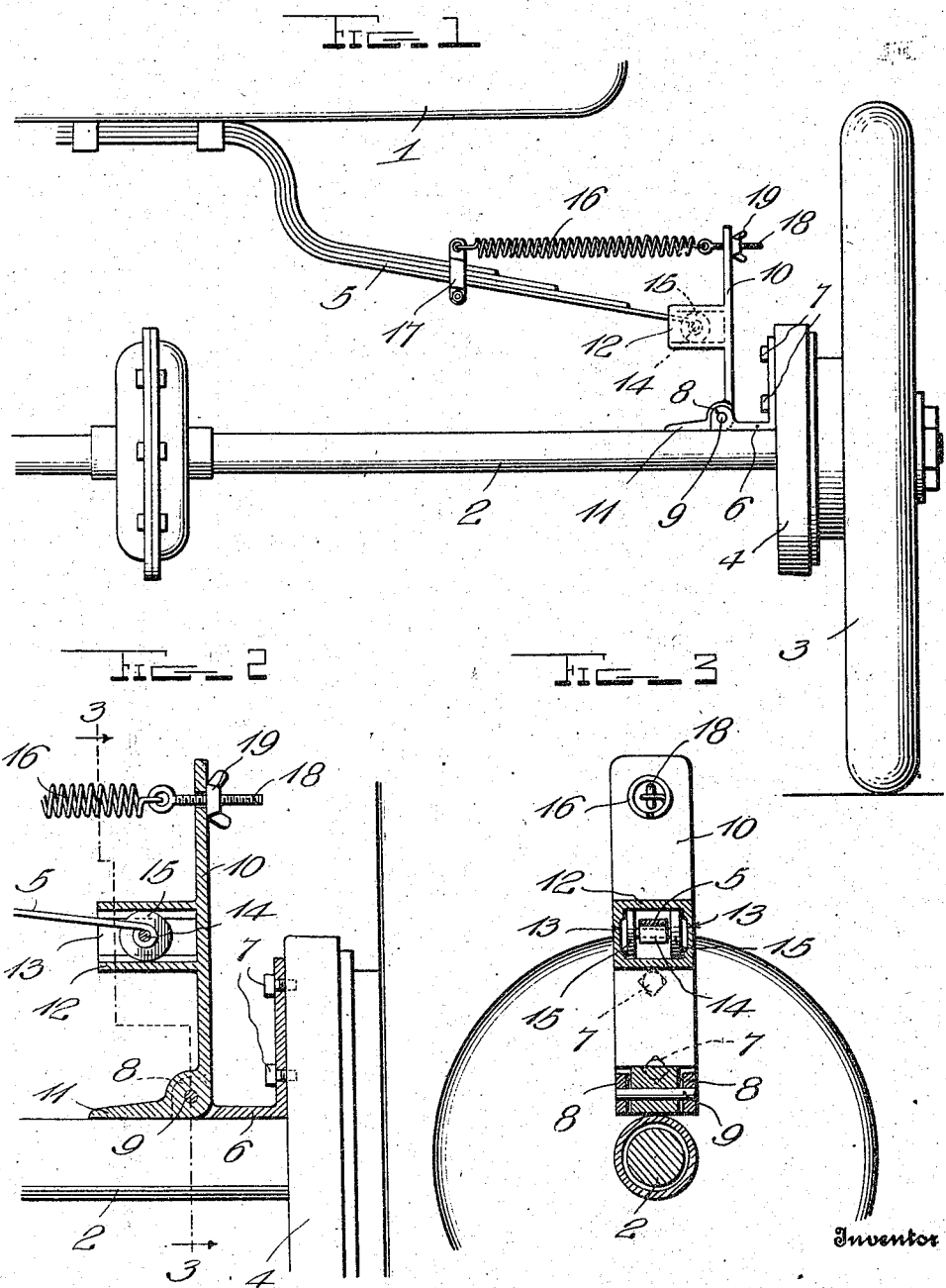

JOHN A. MAUCK, OF PRINCETON, INDIANA.

SHOCK-ABSORBER AND SUPPLEMENTARY SPRING.

1,142,599.     Specification of Letters Patent.     Patented June 8, 1915.

Application filed August 18, 1914. Serial No. 857,339.

*To all whom it may concern:*

Be it known that I, JOHN A. MAUCK, a citizen of the United States, residing at Princeton, in the county of Gibson and State of Indiana, have invented certain new and useful Improvements in Shock-Absorbers and Supplementary Springs; and I do declare the following to be a full, clear, and exact description of the invention, such as will enable others skilled in the art to which it appertains to make and use the same.

This invention relates to new and useful improvements in shock absorbers and my object is to provide a device of this character which is particularly well adapted for use in connection with springs extending transversely of the vehicle, whereby to positively absorb the shock and upward jar to the body of a vehicle incident to the use thereof on rough roads.

A further object of the invention resides in providing a device of the class described which is simple and durable in construction, inexpensive to manufacture and one which will be very efficient and useful in operation.

With these and other objects in view, my invention consists in the novel features of construction, combination and arrangement of parts as will be hereinafter referred to and more particularly pointed out in the specification and claims.

In the accompanying drawing forming a part of this application—Figure 1 is a fragmentary rear elevation of a vehicle having a shock absorber constructed in accordance with my invention applied thereto; Fig. 2 is an enlarged detail section therethrough; and, Fig. 3 is a section as seen on line 3—3 of Fig. 2.

In describing the invention I shall refer to the drawing in which similar reference characters designate corresponding parts throughout the several views and in which 1 indicates the body of a vehicle which is adapted to be supported at its rear end over a rear axle 2, the latter supporting the wheels 3 (only one being shown) and carrying the brake bands 4 for use in connection with said wheels. In some vehicles the body is supported above the rear axle by means of longitudinally extending springs but in the present instance my invention is adapted particularly for use in connection with a transversely extending rear spring. To this end a spring 5 is provided the same being secured to the under face of the body at the rear end in the usual or any preferred manner, said spring being also of the usual design and construction for transversely extending use.

My improved shock absorber coöperates, as stated above with this particular form of spring and in carrying out the idea I provide an angular bracket 6, one arm of which is removably secured by means of bolts or set screws 7 to the inner face of the brake band housing, the opposite arm of said bracket resting flatly upon the rear axle housing, as clearly shown in Figs. 1 and 2 of the drawing. This latter arm of the bracket has a pair of spaced apart ears 8 formed at the outer end thereof, said ears extending upwardly and receiving therethrough a pintle 9. Fulcrumed on this pintle is the lower end of a bar or lever 10, said lower end of the lever having a laterally extending foot piece or the like 11 formed thereon which is designed to engage and rest flatly upon the housing of the rear axle to limit the swinging movement of the lever 10 in one direction. Formed integral with this arm or lever 10 intermediate the ends thereof and projecting laterally inward therefrom is a housing or the like 12 which is square in cross section and has the outer end thereof open. The inner faces of the side walls of this housing are slightly channeled longitudinally as shown at 13. The outer end of the lower leaf of the spring member 5 is bent around and secured to a short shaft or pin 14 which rotatably supports at its ends a pair of rollers 15, the latter being of such diameter as to be readily received in the housing 12. The pin or shaft 14 is also of such size as to permit the outer faces of said rollers to contact lightly with the inner faces of the side walls of said housing and the latter will, therefore, form a guide and support for the outer end of the spring and at the same time permit the movement of the latter with respect to the lever.

In view of the particular construction as above described it is apparent that a play in the connection between the outer end of the spring and the lever is necessary. It will be seen that the lever 10 with its housing forms a support for the outer end of the spring member 5 and I have provided an improved construction for supporting the lever in its upright position, such means at the same time absorbing the shock incident to the rebounding of the spring. To this end a transversely extending coil spring 16 is provided, one end coil of which is engaged with a clamping member 17 which is secured to the spring member 5 intermediate its one end and the central portion thereof. The opposite end coil of the coil spring 16 is engaged with an eye bolt 18 which is loosely disposed through an opening adjacent the upper end of the lever 10. The outer threaded end of this eye bolt is engaged with a wing nut 19 which when turned home, obviously secures the spring to the lever and admits of an adjustment of the tension of said spring 16.

In operation, it will be appreciated that in the travel of the vehicle the body will be forced downwardly under its weight against the tension of the spring member 5 as ruts and other obstructions in the road are met. As the body is forced downwardly against the tension of the spring member 5, the outer ends of the latter will be forced outwardly in the housing 12 and will force the lever 10 outwardly on its fulcrum point. This outward movement of the lever 10 will of course be against the tension of the spring member 16, thus preventing an undue outward movement and upon the rebound of the spring member 5 said lever 10 will return to its normal and upright position with force. The inward swinging movement of the lever under such conditions is limited by the engagement of the foot piece 11 thereof with the rear axle housing and the shock incident thereto will be absorbed and the rebound of the spring will be limited by the action of the coil spring 16. This coil spring will obviously prevent the rebounding of the spring member 5 to any appreciable extent, thus absorbing all shock.

While I have shown a particular form of coil spring in the drawing it will be understood that other forms of springs may be used for the purpose.

It will further be understood that while I have shown in the drawing but a portion of the vehicle and spring therefor, and disclosed but a single shock absorber in connection with one end of the rear axle spring, a pair of such absorbers is used in connection with each spring, the same being identical in design and construction.

From the foregoing it will be seen that I have provided a simple, inexpensive and efficient means for carrying out the objects of the invention and while I have particularly described the elements best adapted to perform the functions set forth it is obvious that various changes in form, proportion and in the minor details of construction may be resorted to, within the scope of the appended claims, without departing from the spirit or sacrificing any of the principles of the invention.

Having thus described my invention, what I claim is:

1. In a shock absorber, the combination with an axle and a carrying spring above the same, of a lever fulcrumed at its lower end on the axle and having an inwardly projecting housing formed intermediate the ends thereof, means for limiting the inward swinging movement of the lever on the casing, a roller carried on the outer end of said spring and rotatably received within the aforesaid housing, and a tension spring connecting an intermediate portion of said spring with the upper end of said lever.

2. The combination with a transverse vehicle axle, and a transverse spring above the same, of an L-shaped bracket hinged at its angle to said axle to swing outwardly toward the outer end thereof, the horizontal arm of said bracket resting on the axle and extending inwardly from the hinge, and the upright arm thereof rising above the outer end of the spring and having an opening, a housing projecting inwardly from the intermediate portion of said upright arm and receiving the end of the spring, an eye bolt passing through said opening and having an adjusting nut, and a substantially horizontal coiled shock absorbing spring secured at its inner end to the other spring and at its outer end to said eye bolt.

In testimony whereof I have hereunto set my hand in presence of two subscribing witnesses.

JOHN A. MAUCK

Witnesses:
LEE L. TOWNSHEND,
J. A. GRIESBAUER.